2,520,971
BATH CAPSULE
Stanley Benford, Troy, Mich., assignor to R. P. Scherer Corporation, a corporation of Michigan
No Drawing. Filed Dec. 5, 1966, Ser. No. 598,898
Int. Cl. A61k 9/04; B01j 13/02; B44d 5/06
U.S. Cl. 424—37
2 Claims

ABSTRACT OF THE DISCLOSURE

A bath capsule containing a bath oil, such as mink oil, and having an outer shell made of a gelatin capsule formulation which includes a finely divided titanium oxide coated mica as a pigment.

---

This invention relates to bath oil capsules, and it particularly relates to a bath oil capsule having a particularly pleasing outer appearance.

Soft shell gelatin capsules have been used extensively for many years, particularly for enclosing various medicaments. The capsules have been colored by various dyes or pigments so as to give the capsules a pleasing appearance. One area of use for these capsules is in the cosmetic field. In the cosmetic field, it is particularly important that the capsules have a highly pleasing external shape and appearance. For many years there have been attempts to make a soft shell gelatin capsule which has not only the general size and shape, but also the sheen, luster, and general appearance of a natural pearl since such capsules would have significant appeal in the cosmetic field.

One problem encountered in selecting a suitable pigment for use in a formulation for making a soft shell gelatin capsule is the abrasive properties of certain pigments. The soft gelatin capsules are formed in machines which have capsule forming dies such as shown in U.S. Pat. No. 2,318,718. The dimensions of the capsule depressions in the capsule forming dies are of critical importance and must be maintained in order to properly fill the capsule and to properly seal it. Pigments which have abrasive properties may abrade the depressions in the capsule forming dies to such an extent that the capsules are improperly formed and/or are improperly filled and sealed. Therefore, it is an important consideration in the formulation of soft shell gelatin capsules that no material in the formulating composition will cause abrasion of the capsule forming dies.

It is therefore an important object of this invention to provide a soft shell gelatin capsule having a particularly pleasing external appearance.

It is also an object of this invention to provide a soft shell gelatin capsule for use in the cosmetic field, such as for containing and releasing a bath oil upon dissolving, and having the general size, shape, sheen, and luster of a natural pearl.

It is a further object of this invention to provide a soft shell gelatin capsule containing bath oil and having a pigment which provides the appearance of a natural pearl and yet does not cause abrasion of capsule forming dies.

Further purposes and objects of this invention will appear as the specification proceeds.

Soft shell gelatin capsules are generally formed of a composition which includes gelatin, glycerin, and added water, although other materials may be added to the capsule formulating composition. Plasticizers, such as sorbitol, may be used in the composition. A preservative for the gelatin, such as methyl-p-hydroxy-benzoate, may also be used.

In capsule formulations, coloring agents, as dyes or pigments, may be used. The important component of the capsule formulation of the present invention is the pigment which gives the luster and sheen of a natural pearl to the soft shell gelatin capsule. The substance which has been found to be essential to provide this desired appearance is a titanium oxide coated mica pigment. The material is used in an extremely finely divided form.

In the present invention, the concentration of the pigment in the capsule formulation is of critical importance. If an insufficient amount of the pigment is used, the resulting capsule does not have the desired external appearance of a natural pearl. On the other hand, if an excessive amount of pigment is used, the abrasive properties of the titanium oxide coated mica pigment cause abrasion of the capsule forming dies and thus such excessive amounts cannot be tolerated. The pigment must therefore be used in a concentration of about 1–2% by weight of the capsule formulating composition.

The soft gelatin capsule made in accordance with the invention is particularly useful in the cosmetic field as a bath capsule. The capsules are filled with bath oil, preferably mink oil. The capsule can also contain other materials, such as perfume.

The following examples set forth specific capsules made in accordance with my invention:

EXAMPLE I

A capsule formulating composition was made with the following ingredients:

| Material: | Percent |
|---|---|
| Gelatin | 41.7 |
| Glycerin | 11.0 |
| Sorbitol special (plasticizer) | 13.6 |
| Added water | 32.0 |
| Methyl - propyl - paraben blend (methyl-p-hydroxy benzoate, a gelatin preservative) | 0.2 |
| Titanium oxide coated mica (pigment) | 1.5 |

Following the usual capsule making techniques, sheets were made from the formulation. The sheets were then processed in capsule making machines in the usual manner and mink oil was added to the capsules. The final product was dried until about 12–15% moisture remained in the outer shell of the capsule. The capsules had the external appearance of natural pearls.

EXAMPLE II

A capsule formulation was made in accordance with the following formula:

| Material: | Percent |
|---|---|
| Gelatin | 40.1 |
| Glycerin | 10.1 |
| Sorbitol special (plasticizer) | 12.5 |
| Added water | 35.7 |
| Methyl - propyl - paraben blend (methyl-p-hydroxy benzoate, a gelatin preservative) | 0.2 |
| Titanium oxide coated mica (pigment) | 1.5 |

Sheets of gelatin having the above formulation were made according to usual procedures. The sheets were then passed through a capsule making machine and mink oil was added to the capsules. The capsules were dried and capsules having an outer shell with a moisture content of about 12–15% resulted. The capsules had the size, shape, and appearance of natural pearls.

While in the foregoing, there has been provided a detailed description of various embodiments of the present invention, it is to be understood that all equivalents obvious to those having skill in the art are to be included within the scope of the invention as claimed.

What I claim and desire to secure by Letters Patent is:
1. In a capsule of the type having an outer shell made from a formulation comprising gelatin, glycerin and water, for use as a bath capsule, the improvement comprising said shell having substantially the size and shape of a natural pearl, bath oil enclosed within said outer shell, said shell being dissolvable in bath water to release the bath oil therefrom, and about 1–2% by weight of finely divided titanium oxide coated mica in said outer shell formulation to provide an external luster and sheen of a natural pearl for said outer shell.

2. The article of claim 1 wherein said bath oil is mink oil.

References Cited

UNITED STATES PATENTS

| | | | |
|---|---|---|---|
| 2,925,365 | 2/1960 | Nicholson et al. | 424—37 X |
| 2,954,325 | 9/1960 | Baumann | 424—70 X |
| 3,035,973 | 5/1962 | Klotz | 424—37 |
| 3,087,828 | 4/1963 | Linton | 106—300 X |

RICHARD D. LOVERING, Primary Examiner

U.S. Cl. X.R.

117—64, 100; 252—316, 522; 264—4